Figure 1:
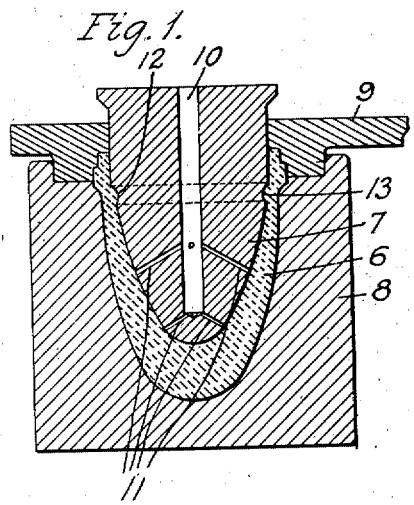

K. E. PEILER.
MANUFACTURE OF GLASSWARE.
APPLICATION FILED JULY 3, 1915.

1,259,281.

Patented Mar. 12, 1918.
2 SHEETS—SHEET 1.

Witness:
S. S. Grotta

Inventor:
Karl E. Peiler.
by Wm H Honiss
Att'y.

K. E. PEILER.
MANUFACTURE OF GLASSWARE.
APPLICATION FILED JULY 3, 1915.

1,259,281.

Patented Mar. 12, 1918.
2 SHEETS—SHEET 2.

Witness:
S. S. Grotta.

Inventor:
Karl E. Peiler.
by W. H. Honiss.
Atty.

UNITED STATES PATENT OFFICE.

KARL E. PEILER, OF HARTFORD, CONNECTICUT, ASSIGNOR TO HARTFORD-FAIRMONT COMPANY, OF CANAJOHARIE, NEW YORK, A CORPORATION OF NEW YORK.

MANUFACTURE OF GLASSWARE.

1,259,281. Specification of Letters Patent. Patented Mar. 12, 1918.

Application filed July 3, 1915. Serial No. 37,847.

*To all whom it may concern:*

Be it known that I, KARL E. PEILER, a citizen of the United States, residing at Hartford, in the county of Hartford and State of Connecticut, have invented new and useful Improvements in the Manufacture of Glassware, of which the following is a specification.

In the manufacture of blown glassware, especially by automatic or semi-automatic machine methods, the charges of molten glass are preliminarily shaped into a blank known as a parison, usually by pressing or drawing the required amount of molten glass into a mold known as a parison mold, in which the mouth portion of the ware is approximately completed, leaving the body and bottom portion to be finally shaped by a blowing mold to which the parison is then transferred while suspended by the neck or mouth portion by means of a mold ring or plunger engaging beneath an external or internal shoulder of the head or neck portion of the parison. In some instances, the parison is lifted out of the parison mold and moved bodily sidewise to the blowing mold, while in other instances the blowing mold is substituted for the parison mold while the parison is thus suspended without moving it sidewise.

In order to release the shoulder of the supporting mold ring or plunger from beneath the supported shoulder of the finished ware, the mold ring or plunger is made with movable sections usually hinged together or are otherwise movable to disengage the parison, and the manipulation of these sections usually requires additional or special mechanism. Moreover, the joints between these hinged movable sections allow of the formation of fins or ridges in the finished ware, which cannot be tolerated for the making of ware which requires a smooth exterior rim, or sealing seat, for which purpose it is necessary to employ a solid mold ring having a smooth unjointed forming surface.

Obviously such a solid mold ring could not be employed for suspending the parison by extending beneath a permanent shoulder of the ware, even if the latter were provided with such a shoulder, since that shoulder would prevent the mold ring from being lifted off the completed ware. In other words, a solid mold ring, although necessary for producing a smooth rim or sealing seat could not be employed for supporting such a parison while transferring it from its parison mold to its blowing mold.

The object of the present invention is to provide a method and means whereby parisons may be transferred from a parison mold to a blowing mold without utilizing or requiring any external shoulder or any permanent shoulder anywhere upon the ware by which to support it, and which may be employed for the blowing of ware either necked or neckless upon existing types of glass shaping machinery, with practically no additional parts or mechanism.

In accordance with this invention, the parison is preliminarily formed with an internal temporary supporting shoulder in an uncompleted portion of its wall engaging with a plunger or blowing member by means of which the parison is transferred to the blowing mold, after which the regular blowing operation in expanding and stretching the wall of the body portion of the ware expands the shoulder outwardly and circumferentially of the blank, thus freeing it from the plunger, and enabling the latter to be withdrawn. The bead or shoulder if not required or desired in the finished ware may be wholly merged or absorbed into the wall of the ware.

Figure 2:
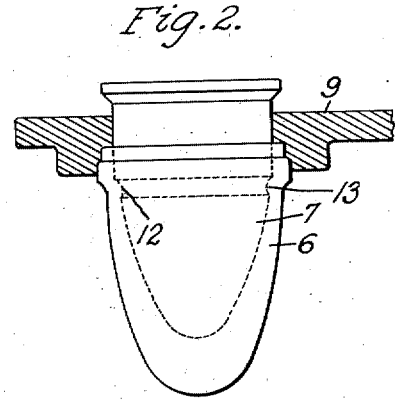
Figure 3:
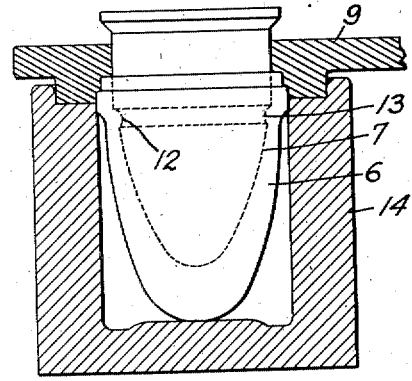
Figure 4:
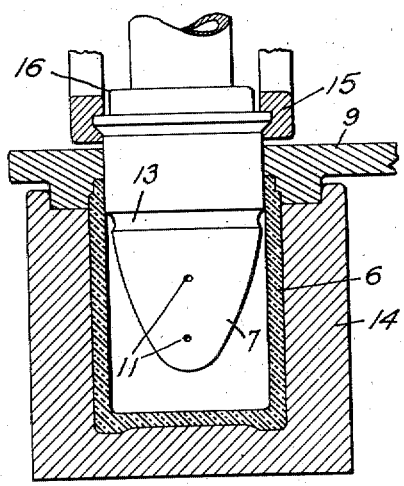
Figure 5:
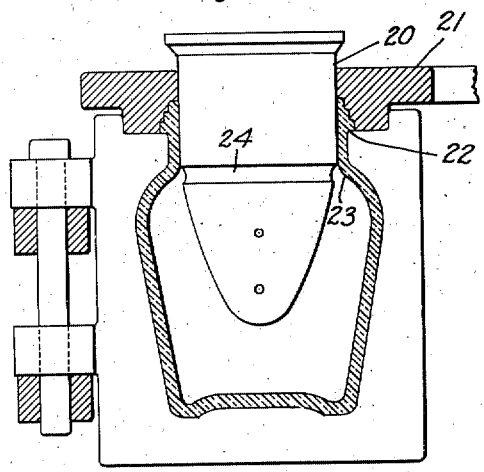
Figure 6:
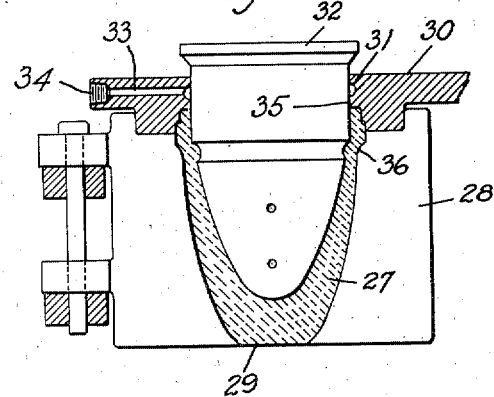

Figure 1 of the drawings is a side elevation, showing a parison mold, mold ring, and plunger, in their pressing relation to a parison. Fig. 2 is a side elevation showing the parison and its mold ring supported by the plunger while transferring them to a blowing mold. Fig. 3 is a side elevation also in section showing the parison mold ring, and plunger of Fig. 2 deposited in a substantially cylindrical blowing mold, in readiness for the blowing operation. Fig. 4 is a view similar to that of Fig. 3, showing the blank expanded by the blowing operation to its ultimate form, leaving the plunger free to be withdrawn. Fig. 5 is an elevation mainly in cross-section taken through its longitudinal center, showing the application of this invention to a shouldered jar. Fig. 6 is a similar cross-sectional elevation showing the application of this invention to methods and apparatus in which the parison is formed by suction which draws the molten glass into the parison mold.

The temporary shoulder of the parison upon which it is supported while being transferred from the parison mold to the blowing mold, is formed by pressing or extruding a portion or portions of its plastic surface into a recess or recesses formed in the wall of the parison forming instrumentalities. What is considered the preferable form of shoulder, illustrated in these drawings, is formed by a circumferential band or bead, which is formed by being pressed into a correspondingly shaped groove in the outer wall of the plunger. The bead or shoulder is formed far enough below the head or neck of the jar and in suitable relation to the body of the jar, so that the subsequent expansion of the body will carry the bead out of its groove in the plunger by which it is formed, and by which it was supported during the parison transferring or mold changing operation.

In the illustration shown in Figs. 1 to 4 inclusive, molten glass is formed into the parison 6 by pressing action between the plunger 7, the parison mold 8 and the mold ring 9, which as explained at the outset may be solid, so as to form a smooth sealing seat, as when the resulting ware is to be hermetically or otherwise tightly sealed. The plunger 7, having an external contour suitable for the desired parison is provided on its external surface with one or more recesses or depressions for receiving and thus forming the temporary supporting shoulders of the parison. For the forming of the circumferential bead 12 of the parison 6, the plunger is provided with a correspondingly shaped circumferential groove 13, into which a portion of the molten glass is extruded by pressing action between the plunger and the parison mold, as illustrated in Fig. 1. Only the forming end of the plunger is here shown, its supporting and manipulating portions being of any customary or desired form. For example, the upper end of the plunger may be extended in the form of a quill or shell, or may be attached to a gate or yoke or cross head of the machine with which it is to be employed, according to the type of machines employed. For completeness of the present illustration the plunger is shown adapted to be supported by a chuck 15, through which the blowing head 16 may be applied as shown in Fig. 4, connecting with the air passage 10 and the distributing branches 11, which are best shown in the cross-sectional view of the plunger in Fig. 1.

After the parison is formed as in Fig. 1, it is transferred to a blowing mold 14 in the position shown in Fig. 3, either by raising the plunger 7 with the mold ring and parison and moving them bodily from the parison mold to the blowing mold, or in other well-known ways substituting the blowing mold for the parison mold. Connection is then made between a blowing head 16 and the plunger 7, which thus becomes a blowing member, through which the blowing operation is then performed, expanding and stretching out the still plastic wall of the blank against the wall of the blowing mold, as shown in Fig. 4. This expansion and stretching out of the wall of the parison withdraws the bead or shoulder 12 out of its groove 13 in the plunger, and if desired absorbs or distributes the bead more or less completely in the wall of the ware, leaving the plunger free to be withdrawn, and with its mold ring to be returned to the same or another parison mold, to make another parison.

Fig. 5 illustrates the invention as applied to the making of necked or shouldered ware. The plunger 20 and mold ring 21 are substantially like those of the previous figures, excepting that the mold ring in this case extends to the bottom of the enlarged collar 22 of the ware. The supporting bead or shoulder of the parison, as shown by the position of the plunger groove 24, is here made at the level of an inner shoulder or corner 23 of the jar, into which the bead is merged by the blowing operation.

Fig. 6 illustrates this invention as applied to methods and machines in which the parison 27 is formed by suction, drawing the charge of molten glass into the parison mold 28, through an opening 29 in its bottom wall.

Various ways may be employed for applying the suction devices to the mold, one of which is illustrated in Fig. 6. In that case the mold ring 30 is provided with the annular air passage 31 encircling the plunger 32 and connecting with an outlet 33 in any convenient side or surface of the mold ring, the outlet being preferably threaded as shown at 34, to receive a standard pipe fitting by means of which air connection may be extended to the vacuum producing apparatus of the machine. The joint between the plunger 32 and the inner wall of the mold ring is made loose enough to permit the flow of air at 35 from the top of the parison opening to the air passage 31. Or suitable vertical grooves may be made in the joint surface or surfaces sufficient to allow the air to pass while excluding the molten glass from following beyond the top of the parison opening.

In cases where it is important to avoid leaving any appreciable trace in the finished ware of the temporary supporting bead or shoulder of the parison, the parison should be formed of approximately uniform thickness, compensating for the bead on the inside of the parison wall by forming a depression on the other side of the wall as illustrated at 36 in Fig. 6, thus disposing the molten glass so that it will when expanded leave an approximately uniform thickness of wall.

It will be understood that solid molds may be employed where the external contour of the parison and of the finished ware permits them to be ejected through the mouth of the mold. Otherwise, split or sectional molds are used, as shown in Figs. 5 and 6.

These temporary supporting beads or shoulders of the parison need not be continuous or connected. As to number, depth, form and other characteristics, they should be adapted to the size, weight and plastic condition of the glass, or other conditions of the particular parisons to be handled, or the machines or methods to be employed.

The term "transferring" as herein employed is applicable not only to those conditions in which the parison is actually moved bodily from the parison mold located in one position, to a blowing mold located in a different position, but is applicable also to those conditions in which the parison is merely suspended without movement, while the parison mold or other primary shaping apparatus is taken away and the blowing mold or other secondary shaping apparatus is substituted.

I claim as my invention:—

1. The method of handling parisons, which consists in forming a parison with a temporary shoulder, supporting the parison by the said shoulder, and changing the form of the parison to detach the said shoulder from its supporting means.

2. The method of handling parisons which consists in forming a parison with a temporary shoulder, supporting the said parison by the said shoulder while changing the forming instrumentalities and freeing the said shoulder from its supporting means by the subsequent forming operations.

3. The method of manufacturing glassware, which consists in forming a parison with a temporary internal shoulder, transferring the parison to a shaping mold while supported by said shoulder, and then expanding the parison to release the said shoulder from its supporting means.

4. In the manufacture of glassware, the steps of forming a parison with an internal temporary shoulder, transferring the parison supported by its temporary shoulder, and then expanding the parison and with it the temporary shoulder, to release the shoulder from its supporting transferring means.

5. Steps in the manufacture of glassware, which consist in pressing a parison in a forming mold with a temporary supporting shoulder in engagement with transferring means, then transferring the blank by said shoulder by said means to another forming mold, and then releasing the said shoulder from its transferring means by further shaping operations in the second named forming mold.

6. Steps in the manufacture of glassware, which consist in forming a parison with a temporary supporting shoulder, supporting the parison by the said shoulder, and then reshaping the parison to release its temporary supporting shoulder from its support.

7. Steps in the manufacture of hollow glassware which consist in forming a parison with a temporary internal circumferential bead, then transferring the parison supported by the bead to a blowing mold, and expanding the parison and its bead in the subsequent shaping operations in the said blowing mold.

8. Steps in the manufacture of hollow glassware which consist in forming a parison with a temporary supporting shoulder in the uncompleted wall of the parison, then changing the shaping devices while supporting the parison by said shoulder, then disengaging the shoulder from the support by the succeeding shaping operations.

9. In the manufacture of glassware, the steps of forming a parison around a blowing member, with a temporary internal shoulder in the parison supported by the said member, then expanding the parison and its supporting shoulder away from the said member.

10. Apparatus for shaping parisons for glassware, including a plunger provided with a recess located to receive a temporary portion of the uncompleted wall of the parison to temporarily support the parison by the plunger, and means for reshaping the said temporary portion to release it from the said recess.

11. Apparatus for shaping and transferring parisons for glassware, including a shaping plunger provided with an annular recess located to temporarily receive inpressed portions of the uncompleted wall of the parison to temporarily support the parison while transferring it to other shaping devices, and means for reshaping the uncompleted wall to release the said in-pressed portion of said recess.

12. Apparatus for shaping and transferring parisons, including a parison mold and plunger, the plunger being provided with an annularly disposed recess located to receive a temporarily in-pressed portion of the parison in the parison forming operation, and a reshaping mold having an annular space substantially opposite the said in-pressed portion when the parison is in reshaping position therein, for receiving the glass displaced by the reshaping of the parison to release the in-pressed portion from the plunger.

13. A parison mold, a plunger for the said mold having upon its circumference a recess located to receive a temporarily in-pressed portion of the plastic inner wall of the parison, and a reshaping mold having a space outside of and substantially opposite the in-pressed portion of the parison sufficient to receive the glass displaced by the reshaping of the parison to release the said in-pressed portion from the plunger.

14. The combination of a blowing member having a recess upon its side surface, means for forming a parison of molten glass around the said plunger, whereby a portion of the plastic glass is temporarily formed in the said recess, and a blowing mold for receiving the parison, having a space between its side wall and the said side surface of the member sufficient for receiving the glass displaced from the said recess by the blowing operation.

Signed at Hartford, Connecticut, this 2nd day of July, 1915.

KARL E. PEILER.

It is hereby certified that in Letters Patent No. 1,259,281, granted March 12, 1918, upon the application of Karl E. Peiler, of Hartford, Connecticut, for an improvement in "The Manufacture of Glassware," an error appears in the printed specification requiring correction as follows: Page 3, line 117, claim 11, for the word "of" read *from;* and that the said Letters Patent should be read with this correction therein that the same may conform to the record of the case in the Patent Office.

Signed and sealed this 16th day of April, A. D., 1918.

[SEAL.]

F. W. H. CLAY,
*Acting Commissioner of Patents.*

Cl. 49—9.